United States Patent Office.

FRANK LINTZ, OF MOUNT VERNON, INDIANA.

DEODORIZING COMPOUND.

SPECIFICATION forming part of Letters Patent No. 450,870, dated April 14, 1891.

Application filed July 23, 1890. Serial No. 359,686. (No specimens.)

*To all whom it may concern:*

Be it known that I, FRANK LINTZ, a citizen of the United States, residing at the city of Mount Vernon, Posey county, Indiana, have invented a new and useful Composition of Drugs as a Deodorizer, of which the following is a specification.

My composition consists of the following ingredients, combined in the following proportions stated, viz: carbolic acid, eight ounces; oil of cinnamon, six ounces; oil of rose, twenty drops; extract of vanilla, five ounces; oil of bergamot, four ounces. These ingredients are to be thoroughly mingled by agitation.

The mixture is to be used in preparing bodies for burial or as a general disinfectant.

What I claim, and desire to secure by Letters Patent of the United States, is—

The herein-described composition of matter to be used as a deodorizer, consisting of carbolic acid, oil of cinnamon, oil of rose, extract of vanilla, and oil of bergamot, in the proportions specified.

FRANK LINTZ.

Witnesses:
D. O. BARKER,
F. P. LEONARD.